Aug. 23, 1949.    F. P. HALL ET AL    2,479,743
LEAK INDICATOR FOR SEALED RECEPTACLES
Filed April 24, 1947
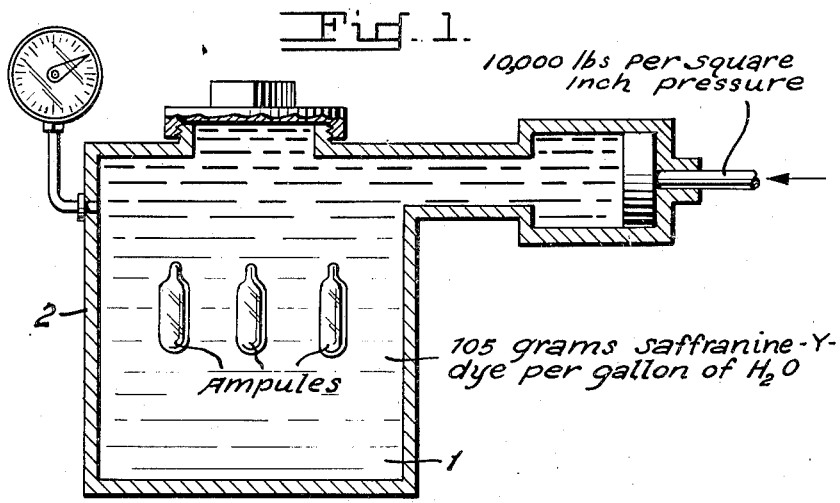
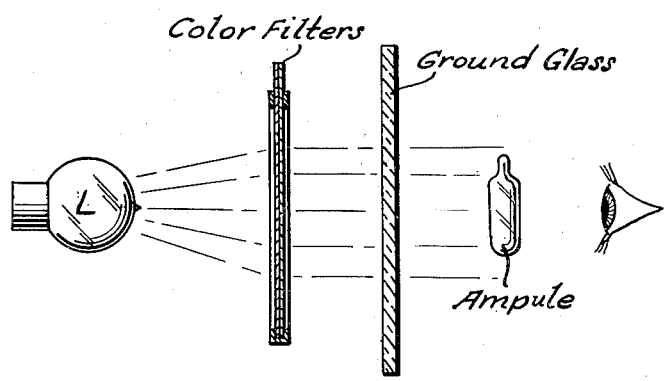
Inventors,
Flemmon P. Hall
Donald C. Newton Patented Aug. 23, 1949

2,479,743

UNITED STATES PATENT OFFICE 2,479,743

LEAK INDICATOR FOR SEALED RECEPTACLES

Flemmon P. Hall, Geddes, and Donald C. Newton, Syracuse, N. Y.

Application April 24, 1947, Serial No. 743,726

2 Claims. (Cl. 73—40)

The present invention relates to methods for testing sealed receptacles for leakage and is more particularly concerned with providing a visual indicator for detecting low order leakers among chemical fuse ampules together with a method for employing the indicator.

Chemical fuses forming a part of various ordnance items such as bombs, anti-tank mines and the like contain a sealed glass ampule which upon being crushed, for instance by the movement of a heavy vehicle of 10,000 pounds or more over the mine, releases an acid mixture present in the ampule which ignites the fuse and the mine. In various chemical mines used by the U. S. Army the fuse ampules contain a combination of an antifreeze, such as orthonitrotoluene, and 96% sulfuric acid. At room temperature this mixture will accommodate up to twelve per cent by volume of an addition of water without exhibiting a secondary liquid phase. However, it has been determined that the addition of more than four per cent by volume of water to the ampule causes a delayed action in the firing of the fuse at low temperatures.

To assure the proper functioning of the ampules they are tested before assembly by being subjected to 10,000 pounds per square inch hydrostatic pressure. Water is employed in the presure chamber along with sufficient water-soluble oil to lubricate the pressure pump. In some instances the ampules during this test leak minutely through the fine pores of the glass and permit infiltration of the water during the course of the test to such an extent that between a four to twelve per cent addition of water is introduced to the ampule contents. Such ampule contents as are so diluted are not readily detectable, but cause delayed actions in the firing of the mines at low temperatures.

It is therefore necessary to detect the undesirable ampules by employing a visual indicator meeting the following requirements:

1. The indicator must color the ampules contents so as to be readily discernible by visual inspection.

2. It must not decompose and thereby lose its differentiating color upon standing or upon boiling.

3. Any addition of the indicator below the amount sufficient for easy detection in the ampule must not interfere with the efficacy of the ampule contents.

4. The indicator and the medium in which it is dissolved must be safe for use in the hydrostatic tests to which the ampules are subjected.

5. The indicator must be detectable in very low concentrations.

The principal object of the present invention is therefore to provide an indicator meeting the foregoing requirements and which is readily available on the commercial market and economical to procure.

Saffranine-Y Extra Concentrated, a water soluble dye, has been discovered as an indicator for the present purposes that meets all of the requirements and which in use eliminates the possibility of ampules defective due to their moisture content from being assembled in mine fuses.

In the drawings:

Figure 1 is a schematic diagram of the pressure system used in testing ampules.

Figure 2 is a schematic diagram of the optical system used in checking tested ampules for leakage.

To detect low order leakers among the ampules, a saturated aqueous solution 1 consisting of approximately 105 grams of the saffranine dye to each gallon of water is mixed at room temperature and is placed in the pressure cylinder 2 of a hydrostatic pressure pump along with the ampules to be tested. The pressure of the bath is slowly increased to 10,000 pounds per square inch, for example, and then slowly released. The ampules are then removed from the pressure cylinder, washed clean of all surface contamination, dried, and viewed on a back lighted ground optical glass plate, as indicated in Figure 2. The preferable back light is a tungsten filament bulb whose light is transmitted through Wratten filters No. 2A and No. 7 in series with said plate.

In those ampules where the saffranine solution has leaked through the dye shows up in the ampule content as a very definite and easily discernible green where the volumetric addition of the dye solution is .17 per cent or more. Through the use of the tungsten filament light, Wratten filters, and ground glass screen as described above, this limit of detection is appreciably lowered with the exact extent varying with the individual inspector.

The discoloration in the ampule caused by the indicator persists for at least six months and firing tests of fuses with ampules containing sufficient of this indicator to be clearly above the margin of detectability, gave results at medium temperatures entirely comparable with fuses containing ampules which received no moisture therein.

Ampules employed in ordnance items other than mines, for example in delayed action bomb fuses, may be subjected to varying pressures and conditions while being tested, but the foregoing example generally indicates the type of test employed and the saffranine dye can be employed in all tests of this type.

Other indicator solutions that can be used in place of the saffranine solution are a mixture of thymol blue in ethyl alcohol or Sudan orange dye in kerosene. Both of these indicators show as a definite red in the ampule contents. The saffranine is preferred however as it can be used as an aqueous solution which is easier and safer to employ under the test conditions.

We claim:

1. A method of testing sealed glass ampules for leakage consisting in placing said ampules in in a solution of a liquid dye, subjecting said solution temporarily to a high pressure, and thereafter visually examining said ampules individually for the presence of said dye in said ampule.

2. The invention according to claim 1, wherein said ampules are tested by visual examination against a viewing screen in light transmitted through suitable Wratten filters.

FLEMMON P. HALL.
DONALD C. NEWTON.

REFERENCES CITED

The following references are of record in the file of this patent:

UNITED STATES PATENTS

| Number | Name | Date |
|---|---|---|
| 1,516,454 | Norton | Nov. 18, 1924 |
| 1,520,891 | Spurway | Dec. 30, 1924 |
| 1,843,234 | Karnes et al. | Feb. 2, 1932 |
| 1,915,965 | Williams | June 27, 1933 |
| 1,924,747 | Nickerson | Aug. 29, 1033 |
| 1,933,791 | Crouch | Nov. 7, 1933 |
| 1,996,391 | Straus | Apr. 2, 1935 |
| 2,101,741 | Ketcham | Dec. 7, 1937 |
| 2,127,548 | Boyle et al. | Aug. 23, 1938 |
| 2,254,609 | Kinzer | Sept. 2, 1941 |
| 2,407,945 | Bennett | Sept. 17, 1946 |
| 2,416,619 | Fleisher | Feb. 25, 1947 |